United States Patent [19]

Gernet

[11] Patent Number: 4,973,130

[45] Date of Patent: Nov. 27, 1990

[54] TELESCOPIC SPECTACLES GLASSES

[76] Inventor: Hermann Gernet, Dunantstrasse 6, 4400 Muenster, Fed. Rep. of Germany

[21] Appl. No.: 329,436

[22] Filed: Mar. 28, 1989

[30] Foreign Application Priority Data

| Apr. 6, 1988 | [DE] | Fed. Rep. of Germany | 8804514 |
| Jun. 9, 1988 | [DE] | Fed. Rep. of Germany | 8807504 |
| Nov. 10, 1988 | [DE] | Fed. Rep. of Germany | 8814084 |
| Nov. 10, 1988 | [DE] | Fed. Rep. of Germany | 8814085 |
| Feb. 2, 1989 | [EP] | European Pat. Off. | 89102293.1 |

[51] Int. Cl.$^5$ ............................................. G02B 27/02
[52] U.S. Cl. ................................................... 350/145
[58] Field of Search ................................. 350/145, 146

[56] References Cited

U.S. PATENT DOCUMENTS

| 2,389,428 | 11/1945 | Glasser. | |
| 3,273,456 | 9/1966 | Feinbloom | 350/146 |
| 3,522,983 | 8/1970 | Daniels | 350/146 |
| 3,592,525 | 7/1971 | Schultz | 350/146 |
| 4,540,238 | 9/1985 | Edwards | 350/146 |

*Primary Examiner*—Scott J. Sugarman
*Attorney, Agent, or Firm*—Toren, McGeady & Associates

[57] ABSTRACT

A telescopic spectacle lens for telescopic glasses for viewer's eyes with normal eyesight, which is wearable in conventional spectacle frames, made of an optical material shaped to have a lens diameter of 0.00018 m–0.028 m, refractive indicies of 1.349–2.150, axial lens thicknesses of 0.002 m–0.012 m, spherical front surface curvatures of 0.00111 m–0.0174186 m, and spherical rear surface curvatures of 0.0001–0.011 m.

6 Claims, 3 Drawing Sheets

TELESCOPIC SPECTACLES GLASSES

BACKGROUND OF THE INVENTION

The known telescopes, binoculars and microscopes have apertures and diaphragms. For these reasons the user's visual field is small even with minor magnification. For example, common binoculars for theatre goers have a small visual field of 200 m for a 1000 m distance, i.e. an angle of view of only about 11. The stronger the magnification, the smaller is the visual field.

Furthermore, telescopes are to be held and adjusted by hand to assure that the observer's eyes in fact see the desired objects. When looking through telescopes only the central areas of the human retina are used, which are responsible for sharp, clear vision. The remaining very large retinal areas, which are responsible for visual perception of motion, are not used when looking through a telescope.

Known afocal lenses are convex-concave lenses of considerable thickness having spherically curved front and rear surfaces, the front surface curvature being lower in comparison to the rear surface curvature, following well-known optical laws. By definition afocal lenses are lenses without a focal point, which means that parallel incident light beams leave the lenses on the concave side in the same parallel manner but more closely bundled. This bundling of light provides the magnifying effect for the human eye, because an increase of optical information reaches the retina having passed through the pupil (of a given diameter) of the eye of the beholder.

Nevertheless, a magnifying effect of known telescopic spectacles having a large visual field is small. For example the DE G 81 21 262.3 telescopic spectacles a magnifying effect of only 1.15. These telescopic spectacles, 1.15 of G 81 21 262.3, have a refractive index of 1.50, a length diameter of 0.04 m (40 mm), an axial thickness of 0.02 m (20 mm), a spherical front surface curvature of 0.05 m (+10.0 Dpt) and a spherical rear surface curvature of 0.0433 meters (−11.5473 Dpt). The resulting visual field for the eyes of an observer is 1300 m at a distance of 1000 m, i.e. comprising about 66°. The small magnifying effect of telescopic eyeglasses like G 81 21 262.3 is not very susceptible to industrial application, although the visual field is large.

Former known afocal telescopes, for example U.S. Pat. No. 346,002 (Bennet et al, 1944) also have perceptible magnifying effects. However, due to the tubular shape and the apertures and diaphragms inherent in this shape, they have only a small visual field. Furthermore, telescopes as in U.S. Pat. No. 2,346,002 due to their lengths, their high weight and their unwieldiness, can never be worn in conventional spectacle frames. Therefore, telescopes as taught by Bennet et al are not susceptible to industrial application in the sense of the present invention.

In conclusion, up to now, binocular spectacles do not exist, which produce an appreciable magnifying effect for human eyes and at the same time an habitual or at least a relatively large visual field.

Furthermore, an illuminating headpiece for spectacles including secondary magnifying lenses (magnification insert) is known from U.S. Pat. No. 3,592,525 (Schultz 1971). These spectacles have indeed a pronounced magnification because of the tube-shaped magnification insert for the working distance, i.e. for near vision, and simultaneously a large usual field of vision in the remaining region of the spectacle lenses. But these spectacles as well as other similar spectacles (for example Kheeler spectacles for ophthalmologists, are not binoculars for distance because they are made for a working distance of 20 cm. Therefore, the tube axes of the magnification portion are explicitly convergent (see Bennet et al, FIG. 2 and text). Finally the magnification inserts are focal and not afocal, because focusing for the working distance by a (additional refractive power) of +5.0 Dpt is required. This is necessary so that the user perceives a sharp and magnified picture through these inserts. The spectacles according to the U.S. Pat. No.. 3,592,525 for dentists and ophthalmologists and similar spectacles (Kheeler) do not yield a sharp and magnified vision for people having a normal eyesight.

Due to the existing apertures and diaphragms of the magnification inserts, the resulting visual field is small, and amounts to roughly 12 at the near distance for the Kheeler spectacles, and for the Schultz spectacles it is even smaller.

The user of the Schultz spectacles (U.S. 3,592,525) has no binocular distance vision due to the convergent adjustment of the lens axes. Because of the near focusing (+5.0 Dpt) of the magnification insert, a person having normal eyesight cannot see even with approximate sharpness monocularly nor binocularly, rather he perceives only completely blurred images which are also thus not magnified in the true sense of the word. In conclusion, binoculars for distance vision in spectacle frames do not exist, at least such having a large visual field and which are susceptible of industrial application.

The present application is based on our own four Utility Model applications in the Federal Republic of Germany:

G 88 04 514.3 (filing date Apr. 4, 1989),
G 88 07 504.4 (filing date June 9, 1988),
G 88 14 084.9 (filing date Nov. 10, 1988)
G 88 14 085.7 (filing date Nov. 10, 1988)
EP 102293.7 (filing date Feb. 10, 1989) and claims their priorities.

SUMMARY OF THE INVENTION

So-called mini telescopes of the usual type and other afocal systems with greater magnification are relatively large, heavy, unwieldy and cannot be worn in conventional spectacle frames.

Accordingly, it is the aim of this application to develop telescopic spectacle lenses for conventional spectacles with appreciable magnifying effect and simultaneously a large field of vision (habitual viewing), similarly to what has been demonstrated in the course of the last decade by the generally known miniaturization of pocket calculators. Another aim is to reduce the size of such telescopic spectacle lenses to such an extent that they can be worn as comparatively tiny inserts in conventional spectacle lenses and thus enable at the same time magnified and habitual vision. Such mini telescopic spectacle lenses are comparable to more powerful telescopes and less powerful microscopes as far as their magnifying effect for the normal human eye is concerned.

With optimum miniaturization and centering in front of both eyes of the viewer, mini telescopic spectacle lenses make possible sharp and magnified far and rear vision without change of curvature also in case of presbyopia for persons having normal eyesight (and a large part of those having ametropic vision). Presbyopia would require an additional change of one of the spherical surfaces for near vision (+ Dpt addition) in conventional afocal telescopic spectacle lenses corresponding to FIG. 1.

Such mini telescopic spectacle lenses constitute, together with the conventional spectacle lenses surrounding them, a mini universal distance telescope or mini universal distance microscope.

The invention of this application is not obvious to a specialist in Physics or Optics because, although U.S. 2,346,002 (Bennet 1944) and the U.S. Pat. No. 3,592,525 (Schultz 1971) have been well known for decades and in spite of the indubitably wide industrial applicability, no applicant has hitherto come forward in order to file such an application. The invention becomes only obvious after it has been conceived, described and hereby transposed into the mode of thought of specialists versed in Physics and Optics by a person not specialized in Physics and Optics on the basis of his purely medical knowledge of the Physiology and Pathology of human vision. Thus the application rests on an inventive activity, and the subject of the application is new and economically useful.

DETAILED DESCRIPTION OF THE PREFERRED EMBODIMENT

Two types of telescopic spectacles result from the above-mentioned four German Utility model applications.

Figure 1:
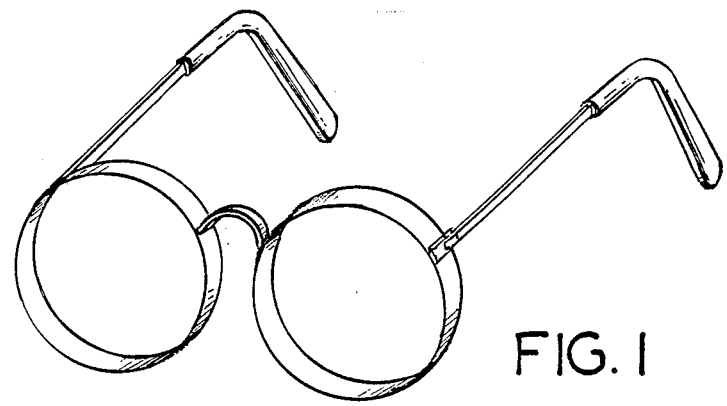
FIG. 1 illustrates a first type of telescopic spectacle.

Telescopic spectacles of a different embodiment are part of the first type in FIG. 1, which according to G 88 04 514.5 and G 88 07 504.4 contain telescopic spectacle lenses alone for themselves in a conventional spectacle frame. The telescopic spectacles enable an appreciable magnification in the entire visual field region with a simultaneously large visual field.

The second type of telescopic spectacles according to G 88 14 084.9 and G 88 14 085.7 constitutes, according to FIG. 22a–c, a telescopic spectacle lens which is so small that it can be only utilized for the central portion of the retina of the eye of the beholder which enables sharp vision, without practically having any apertures or diaphragms.

This telescopic spectacle lens can therefore be worn in conventional spectacle frames similar to U.S. 3,592,525 (Schultz), persons having normal sight in so-called flat lenses, for ametropics in conventional corrective lenses. These telescopic lenses can be fitted ground or bonded in appropriate apertures or fitted into same at the right spot, meaning to be centered in accordance with the prescription of the ophthalmologist or optometrist. By definition the telescope axes are to be arranged parallel to each other in binocular telescopes. These telescopic spectacles of the second type thus have a magnifying portion for the central sharp vision, namely, the telescopic spectacle lens (1) belonging to the area of minioptics as well as a the peripheral conventional spectacle lens portion (2) for the motive vision so important in everyday life.

Figure 2A:
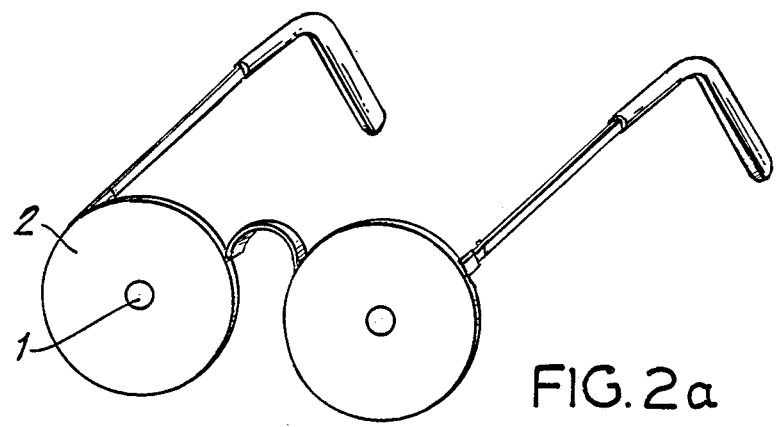
FIG. 2a–c illustrates a second type of telescopic spectacle.
Figure 2B:
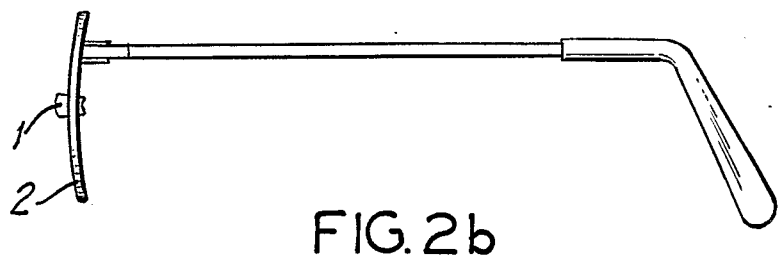
Figure 2C:
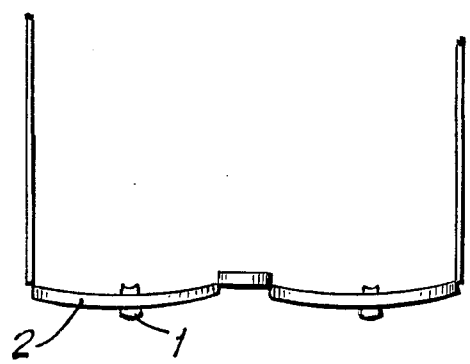

These telescopic spectacles of the second type (FIG. 2a–c) are equipped with mini-telescopic spectacle lenses with appreciable magnification effect for the central vision with, at the same time, still a relatively large visual field and with conventional spectacle lenses in the remaining region for the habitual good motive vision. These spectacles, with an appropriate embodiment have compared with known optical assist means, the additional advantage that presbyopics with normal sight can have near and far sharp and magnified vision because of the minioptical portion, without having to change one of the spherical surface curvatures. This means also, on the other hand, that ametropic persons with spherical refractive abnormalities between plus and minus 3 Diopters or with slight astigmatism can have sharp and magnified distance vision through the mini-telescope spectacle lens without having to change the spherical surface curvature, compared to the curvature value for persons having normal sight. In other words, a single mini-telescopic spectacle lens of appropriate design provides magnified sharp vision not only for persons having normal eyesight, but rather also to most of the ametropic persons. FIG. 2a–c shows a mini-telescopic spectacle lens ground out of the solid lens. It has the advantage that a conventional spectacle glass mold with additional mini-telescopic spectacle glass form can be utilized for glass blank manufacture. Holes and bores thus become superfluous.

Telescopic spectacle lenses and telescopic spectacles of both types have manifold usage, for instance in the theater, for observing the landscape, in sports arenas, for hunting, fishing, etc., for professional purposes such as precision mechanics, manufacturing of microchips, for watch makers, jewelers, for medical purposes, for example, for people with impaired eyesight and for various other purposes. Therefore, the subject of this application is capable of many industrial uses.

The reason for the manifold usability of telescopic spectacle lenses and of telescopic spectacles is the simultaneous real time utilization of all, meaning the central and the peripheral functional potentials, of the central and the peripheral functional potentials, of the human eye. Therefore, a beholder sees more and better than even with the most modern available optical media. By way of comparison, the vision of a beholder and the optical perception of his environment is not only as good as but even better than, the vision of a celebrity invited to be a guest in a talk show; the simultaneous real time optical information of such a guest about his surroundings in a television studio is better by a multiple than the optical information of a television viewer viewing the show in spite of all possibilities of modern television, including zoom, magnification, and segmental magnification.

Finally, mini-telescopic spectacle lenses with a high refractive index, a strongly spherically curved inner radius, and small axial thickness have accordingly, a very high refractive power of the spherical surfaces. If the lens installed for a specific working distance in telescopic spectacles so as to be appropriately convergent with their axes, they can be used as binocular mini-microscopes (microscopes for surgical operations) which with the corresponding design, provide a greatly magnified image for distance and proximity if they are appropriately designed without changing the spherical surface curvature. These lenses thus constitute universal distance mini-microscopes.

Telescopic spectacle lenses of different design are described in the FIGS. 3a to 3i, which are to be worn alone and for themselves corresponding to FIG. 1 in front of both eyes of the beholder in a conventional spectacle frame.

FIG. 3 shows a telescopic spectacle lens made of highly refractive glass (refractive index n=1.93) in longitudinal section.

The spherical front surface curvature amounts to 0.01678 m (+55.4232 Dpt) and the spherical rear surface curvature amounts to 0.11 m (−84.4559 Dpt). The lens cross section amounts to 0.026 m (26 mm) and the axial glass thickness amounts to 0.012 m (12 mm).

This telescopic spectacle lens located in conventional spectacle frames respectively in front of both eyes of a person having normal vision has the refractive power of 0.01 Dpt, meaning it is practically afocal and the magnification is V =1.526.

An additional dioptric effect for compensation of spherical refractive defects of eyes of users (here, for instance, +2.75 Dpt) is achieved while keeping the same length material, the axial thickness and the spherical rear surface curvature, by appropriately steepening the front face curvature. The telescopic spectacle lens must then have a spherical front face curvature of 0.016256 m (+57.2099 Dpt), and the lens or glass diameter can be reduced to 0.023 m.

There then results a magnification V of 1.55.

Figure 3A:
FIGs. 3a–i illustrate longitudinal sections of a lens pursuant to the present invention made of lowly to highly refractive glass.
Figure 3B:

FIG. 3b shows a telescopic spectacle lens of more highly refractive optical material (plastic material) with a refractive index n =1.70 in longitudinal section.

The spherical front surface curvature of the telescopic spectacle lens amounts to 0.008088 m (+86.5486 Dpt), and the spherical rear surface curvature amounts to 0.005 m (140.0012 Dpt). The glass or lens diameter amounts to 0.0165 m, and the axial glass thickness amounts to 0.0075 m. This telescopic spectacle lens has a refractive power of +0.004 Dpt, meaning it is practically afocal and the magnification V=1.618.

If one wants in accordance with FIG. 3a to eliminate the refractive defects of viewers'eyes (here =2.75 Dpt) also for the telescopic spectacle lens in FIG. 3b, then, while keeping the optical material, the axial glass thickness and the rear surface curvature the same, only the spherical front surface curvature is to be steepened to 0.007934 m (+88.2285 Dpt) and the glass or lens diameter is to be reduced to 0.016 m. a physical magnification V of 1.637.

Figure 3C:

FIG. 3c shows a telescopic spectacle lens of highly refractive glass (n=1.93) in longitudinal section. The spherical front surface curvature amounts to 0.008613 m (+107.9974 Dpt), and the spherical rear surface curvature amounts to 0.005 m (−186.0015 Dpt). The lens diameter amounts to 0.015 m, the axial lens or glass thickness is 0.0075 m.

These telescopic spectacle lenses located in conventional spectacle frames respectively in front of both eyes of the normal sighted wearer have the refractive force of +0.02 Dpt, meaning they are for all intents and purposes afocal, and the physical magnification is V =1.72.

If one wants to compensate spherical refractive errors of viewer eyes (here, for instance, +2.75 Dpt) also for the telescopic spectacle lens in FIG. 3c, then only the spherical front surface curvature must be steepened to 0.088489 m (+109.5542 Dpt) and the lens diameter must be reduced to 0.0145 m, while leaving the optical material, the axial lens thickness and the rear surface curvature unchanged. There then results a physical magnification of V=1.7413.

If a telescopic spectacle user has an astigmatic refractive defect of the eyes in addition to the spherical one, then the front surface of the lens is to be shaped according to known optical laws in such a way, meaning with a toroidal surface, that the spherical as well as the astigmatic refractive defects of the user are compensated for.

Figure 3D:

FIG. 3d shows a telescopic spectacle lens of transparent plastic material with a low refractive index (n=1.349), in longitudinal section. The spherical front face curvature amounts to 0.014104522 m (+24.7438 Dpt), the spherical rear surface curvature amounts to 0.011 m (−31.7273 Dpt). The lens diameter amounts to 0.024 m, and the axial lens thickness amounts to 0.012 m.

This telescopic spectacle lens located in conventional spectacle frames respectively in front of both eyes of the normal sighted beholder has the refractive force of 0 Dpt, meaning it is afocal, and the magnification V =1.282.

An additional dioptric effect for compensation of spherical refractive defects of the eyes of viewers (here, for instance, +2.75 Dpt for hyperopia or also for presbyopia) is achieved by steepening the spherical front face curvature correspondingly while leaving the optical material, the axial thickness and the spherical rear surface curvature the same. The telescopic spectacle lens must, in that case, have a front surface curvature of 0.013213605 m (+26.412172 Dpt), and the glass diameter can be reduced to 0.023.

Figure 3E:

FIG. 3e shows a telescopic spectacle lens of plastic material with a refractive index n=1.349, in longitudinal section.

The spherical front surface curvature of the telescopic spectacle lens amounts to 0.006940326 m (+50.2858 Dpt), the spherical rear surface curvature amounts to 0.005 m (−69.80 Dpt). The lens diameter amounts to 0.013 m, and the axial lens or glass thickness amounts to 0.0075 m. The telescopic spectacle lenses have a refractive force of 0 Dpt, they are afocal and the magnification is 1.388.

If one wants to also compensate spherical refractive defects of user eyes (in this case +2.75 Dpt) also for the telescopic spectacle lens in FIG. 3e according to FIG. 3d , then only the front surface curvature must be steepened to 0.006747745 m (+51.720986 Dpt) and the lens diameter must be reduced to 0.012 m, while leaving the optical material, the axial lens thickness and the rear surface curvature the same.

The diagram 3f shows a telescopic spectacle lens from optical glass in longitudinal section wherein the refractive index is 1.5182.

The spherical front surface curvature amounts to 0.007559939 m (+68.5455 Dpt), the spherical rear surface curvature amounts to 0.005 m (−103.640 Dpt), the lens diameter amounts to 0.014 m, and the axial lens thickness is 0.0075 m.

These telescopic spectacle lenses located in usual spectacle frames respectively in front of both eyes of a normal sighted wearer have a refractive force of 0 Dpt, they are afocal and the magnification V =1.512.

Figure 3F:

If one wants, according to FIG. 3d, to compensate spherical refractive defects of viewer's, eyes (for instance =2.75 Dpt) also for the telescopic spectacle lens in FIG. 3f then only the front surface curvature is to be steepened to 0.07428587 m (+69.75755 Dpt) and the lens diameter must be reduced to 0.0135 m, while leaving the optical material, the axial lens thickness and the rear surface curvature the same. There then results a magnification V of 1.512.

Figure 3G:

FIG. 3g shows a telescopic spectacle lens of transparent inorganic-organic plastic material (so-called ORMOCERE) with a refractive index of 1.680 in longitudinal section.

The spherical front surface curvature is 0.008035714 m (+84.6222 Dpt), and the spherical rear surface curvature is 0.005 m (−136.00 Dpt). The lens diameter is 0.015 m, and the axial lens thickness is 0.0075 m.

These telescopic spectacle lenses located in usual spectacle frames respectively in front of both eyes of a normal sighted wearer have a refractive force of 0 Dpt, they are afocal and the magnification V = 1.6068.

If one wants, according to FIG. 3d, to compensate spherical refractive defects of viewer's, eyes (for instance =2.75 Dpt) also for the telescopic spherical lens in FIG. 3g then only the front surface curvature is to be steepened to 0.007934986 m (+85.6964 Dpt) and the lens diameter must be reduced to 0.0145 m, while leaving the optical material, the axial lens thickness and the rear surface curvature the same. There then results a magnification V of 1.6068.

Figure 3H:

FIG. 3h shows a telescopic spectacle lens of highly refractive glass (for instance, LaSF 35) with a refractive index of 2.020, in longitudinal section.

The spherical front surface curvature is 0.0087871 m (+116.078873 Dpt), the spherical rear surface curvature is 0.005 m (−204.00 Dpt), the lens diameter is 0.016 m, and the axial lens thickness is 0.0075 m.

These telescopic spectacle lenses located in usual spectacle frames respectively in front of both eyes of a normal sighted wearer have a refractive force of 0 Dpt, they are afocal and the magnification V = 1.7571.

If one wants to compensate spherical refractive defects of viewer's, eyes (for instance +2.75 Dpt) also for the telescopic spectacle lens in FIG. 3h, then only the front surface curvature is to be steepened to 0.00879523 m (+116.9789 Dpt) and the lens diameter must be reduced to 0.0155 m, while leaving the optical material, the axial lens thickness and the rear surface curvature the same. There then results a magnification V of 1.7571.

Figure 3I:
Figure 5A:
Figure 5B:
Figure 5C:
Figure 5D:
Figure 5E:
Figure 5F:
Figure 5G:
Figure 5H:
Figure 5I:
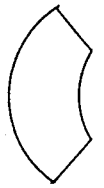

FIG. 3i shows a telescopic spectacle lens of transparent inorganic-organic plastic material (so-called ORMOCERE) with a refractive index of 2.150, in longitudinal section.

The spherical front surface curvature is 0.0174186 m (+66.02136 Dpt), the spherical rear surface curvature is 0.011 m (−104.5455 Dpt), the largest lens diameter is 0.028 m (28 mm), the smallest diameter is 0.015 m (15 mm) and the axial lens thickness is 0.012 m.

These telescopic spectacle lenses located in usual spectacle frames respectively in front of both eyes of a normal sighted wearer have a refractive force of 0 Dpt, they are afocal and the magnification V = 1.5832.

If one wants, according to FIG. 3d, to compensate spherical refractive defects of viewers' eyes (for instance +2.75 Dpt) also for the telescopic spherical lens in FIG. 3i then only the front surface curvature is to be steepened to 0.0171321 m (=67.1256 Dpt) and the lens diameter must be reduced to 0.0265 m (226.5mm), while leaving the optical material, the axial lens thickness and the rear surface curvature unchanged. There then results a magnification V of 1.5832.

If a user of the telescopic spectacles has an astigmatic refractive defect in the eyes in addition to the spherical one, then the glass front surfaces are to be shaped in accordance with known optical laws in such a way, meaning with a toroidal surface, that the spherical as well as the astigmatic refractive defect of the eyes of the beholder are compensated.

In FIGS. 4a to 4f a mini-telescopic spectacle lens is described in another embodiment, which centered for distance, is worn in usual spectacle lenses of telescopic spectacles of the second type (see FIG. 2). The lens is shaped in such a manner that as large a visual field as possible is obtained with due regard to the distance of the telescopic spectacle lens from the cornea and the pupil of the eye. Therefore, the mini-telescopic spectacle lenses depicted in the FIGS. 4 are not tube shaped, rather they have conically shaped side portions.

Those mini-telescopic spectacle lenses whose spherical inside curvature is high (small inside curvature radius), have necessarily a small visual field, in return however, they large magnification in the sense of a mini-microscope and a correspondingly larger habitual visual field in the remaining non-telescopic spectacle glass region.

Figure 4A:
FIGs. 4a–f illustrate longitudinal sections of mini-telescopic lenses pursuant to the present invention.

FIG. 4a shows a mini-telescopic spectacle lens of highly refractive glass with a refractive index n=2.020 in longitudinal section.

The spherical surface convex shaped amounts to 0.00402 m (4.02 mm=+253.43 Dpt), the spherical rear surface convex shape amounts to 0.0015 m (1.5 mm=−680.00 Dpt), the largest lens diameter is 0.006 m (6.0 mm) and the axial glass thickness is 0.005 m (5. mm).

These telescopic spectacle lenses placed in a telescopic pair of spectacles in front of both eyes of the viewer are afocal with a refractive power of 0 Dpt. For an eye of a dimension of the normal eye (Gernet 1973) and having normal eyesight, it has a magnification of 2.6827.

If one wants to compensate with the telescopic spectacle lens of FIG. 4a spherical refractive defects of the viewer's eye (for instance +2.75 Dpt for a normal eye with a human eye lens of inadequate refractive power), then the spherical front surface curvature must not be additionally steepened because of the unusual shape of this mini-telescopic spectacle lens, rather all parameters of the described telescopic spectacle lens can remain unchanged. The magnification amounts to 2.7955 for the above-mentioned ametropic eye of the viewer (+2.75 Dpt).

Figure 4B:

FIG. 4b shows a mini-telescopic spectacle lens of high refractive glass with a refraction index of 2.020, in longitudinal section. The spherical front surface convexity amounts to 0.00301 m (3.01 mm=+338.33 Dpt), the spherical rear surface convexity amounts to 0.0015 m (1.5 mm=−680.00 Dpt), the largest lens diameter amounts to 0.0056 m (5.6 mm), and the axial lens thickness amounts to 0.003 m (3.0 mm).

This mini-telescopic spectacle lens placed in a telescopic pair of spectacles before both eyes of a viewer is afocal with a refractive power of 0 Dpt. For a normal sighted viewer's eye with a dimension of the normal eye it has a magnification of 2.0095.

Figure 4C:

FIG. 4c shows a mini-telescopic lens of highly refractive glass with a refraction index of 2.020, in longitudinal section.

The spherical front face convexity amounts to 0.00201 m (2.01 mm=+507.49 Dpt), the spherical rear surface convexity amounts to 0.001 m (1.0 mm=1020.00 Dpt), the largest lens diameter amounts to 0.004 m (4.0 mm), and the axial lens thickness amounts to 0.002 m (2.0 mm).

This mini-telescopic spectacle lens placed in a telescopic pair of spectacles before both eyes of a viewer is afocal with a refractive power of 0 Dpt. For a normal sighted viewer's eye with a dimension of the normal eye it has a magnification of 2.0095.

Figure 4D:

FIG. 4d shows a mini-telescopic spectacle lens of highly refractive glass (for instance La SF 35) with a refraction index of 2.020, in longitudinal section.

The spherical front face convexity amounts to 0.00429 m (4.29 mm = +237.92 Dpt), the spherical rear surface convexity amounts to 0.0005 m (0.5 mm = −2040.00 Dpt), the largest lens diameter amounts to 0.0042 m (4.2 mm), and the axial lens thickness amounts to 0.0075 m (7.5 mm).

This mini-telescopic spectacle lens placed respectively before both eyes of the viewer has the refractive power of 0 Dpt, meaning it is afocal and the magnification is 8.5726 for an eye with normal eyesight and with the dimensions of the normal eye.

If one wants to compensate spherical refractive defects of a viewer's eye (for instance +2.75 Dpt for a normal eye with a human eye lens of insufficient refractive power) with minitelescopic spectacle lens in FIG. 4d, then the spherical front surface curvature must not be additionally steepened because of the unusual shape of this telescopic spectacle lens, rather all parameters of the described telescopic spectacle lens can remain unchanged. The magnification amounts to 8.921 for the above-mentioned ametropic normal eye (+2.75 Dpt).

It is conceivable that a telescopic spectacle lens with an appreciably smaller spherical inner surface curvature will make sense because of future considerably refined centering methods and possibilities of a mini-telescopic spectacle lens of different designs with respect to the line of sight of the eyes of viewers. Naturally, also in the case of such a telescopic spectacle lens the two center points of the spherical outer and inner surface curvature must lie precisely on the central axis of the telescopic spectacle lens, such as it applies by definition for any telescopic spectacle lens.

Figure 4E:
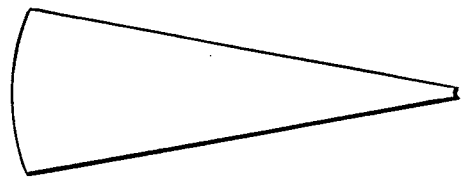

FIG. 4e shows such a mini-telescopic spectacle lens. A clear drawing of this lens is exceptionally only possible magnified at a scale of approximately 10:1 because of the high spherical inner curvature.

The spherical front surface curvature amounts to 0.00389 m (3.89 mm = +262.40 Dpt), the spherical rear surface curvature amounts to 0.0001 m (0.1 mm = 10200.00 Dpt), the largest lens diameter at the boundary to the front surface curvature amounts to 0.0036 m (3.6 mm), the smallest lens diameter at the boundary to the rear surface curvature amounts to 0.00018 m (0.18 mm), the axial lens thickness amounts to 0.0075 m (7.5 mm), and the refractive index of the highly refractive lens amounts to 2.020.

The telescopic spectacle lens placed in a telescopic pair of spectacles respectively before both eyes of a viewer has a refractive power of 0 Dpt, meaning it is afocal; it has a magnification of 38.8638 (38.9 times) for a normal sighted viewer's eye with the dimensions of the normal eye.

Figure 4F:

FIG. 4f shows a mini-telescopic spectacle lens of highly refractive glass (refractive index n=2.020) with such a high rear surface- (inner surface-) convexity that this lens can exceptionally only be depicted also only magnified at an approximate scale of 10:1 in longitudinal section.

The spherical front surface curvature amounts to 0.00111 m (1.11 mm = +919.00 Dpt), the spherical rear surface convexity amounts to 0.0001 m (0.1 mm = −10200 Dpt), the largest lens diameter amounts to 0.0012 m (1.2 mm), the smallest is 0.00018 m (0.18 mm), the axial lens thickness amounts to 0.002 m (2.0 mm). This mini-telescopic spectacle lens located in a telescopic pair of spectacles respectively in front of both eyes of the viewer is afocal with its refractive power of 0 Dpt. The lens has the magnification of 11.0969 (11.1 times) for a viewers eye with normal eyesight and with the dimensions of the normal eye. Also together with conventional spectacle lenses in conventional spectacle frames. Some of these lenses, namely mini-telescopic spectacle lenses of specific designs, permit for the first time sharp and magnified vision at a distance and proximity without change of one of the spherical surface curvatures for presbyopic persons with normal vision and for a portion of persons having ametropic vision. When suitably arranged, the last mentioned lenses constitute universal distance mini-microscopes.

We claim:

1. A telescopic spectacle lens for telescopic glasses for viewers' eyes with normal eyesight, which is wearable in conventional spectacle frames, comprising an optical material shaped to have a lens diameter of 0.00018 m (0.18 mm) to 0.028 m (28 mm), refraction indices of 1.349 to 2.150, axial lens thicknesses of 0.002 m (2.0 mm) to 0.012 m, (12 mm), spherical front surface curvatures of 0.00111 m (1.11 mm) to 0.0174186 m (17.4186 mm), and spherical rear surface curvatures of 0.0001 (0.1 mm) to 0.011 m(11 mm).

2. A telescopic spectacle lens according to claim 1, wherein the spherical front surface includes an additional dioptric effect for compensation of spherical refractive defects of ametropic viewers' eyes for distance and/or proximity.

3. A telescopic spectacle lens according to claim 1, wherein the front surface has an additional toroidal convexity for compensation of astigmatic refraction defects of ametropic eyes of viewers.

4. A telescopic lens according to claim 1, wherein the optical material is glass.

5. A telescopic lens according to claim 1, wherein the optical material is plastic.

6. A telescopic spectacle lens according to claim 2, wherein the front surface has an additional torioidal convexity for compensation of astigmatic refraction defects of ametropic eyes of viewers.

* * * * *